United States Patent [19]

Klee

[11] E Re. 28,712

[45] Reissued Feb. 17, 1976

[54] PARALLEL FLOW CRYOGENIC FREEZER

[75] Inventor: David J. Klee, Emmaus, Pa.

[73] Assignee: Air Products and Chemicals, Inc., Allentown, Pa.

[22] Filed: Aug. 6, 1969

[21] Appl. No.: 849,223

Related U.S. Patent Documents

Reissue of:

[64] Patent No.: 3,345,828
Issued: Oct. 10, 1967
Appl. No.: 463,196
Filed: June 11, 1965

[52] U.S. Cl. ..... 62/216; 62/65
[51] Int. Cl.[2] ..... F25D 3/10
[58] Field of Search ..... 62/64, 380, 63, 374, 216, 62/65

[56] References Cited

UNITED STATES PATENTS

| | | | |
|---|---|---|---|
| 2,059,970 | 11/1936 | Robillard | 62/64 X |
| 3,115,756 | 12/1963 | Overbye | 62/63 X |
| 3,238,736 | 3/1966 | Macintosh | 62/64 X |
| 3,258,935 | 7/1966 | Ross | 62/64 |
| 3,277,657 | 10/1966 | Harper et al. | 62/64 |
| 3,376,710 | 4/1968 | Hirtensteiner | 62/64 X |
| 3,413,818 | 12/1969 | Pelmulder | 62/64 X |

*Primary Examiner*—William E. Wayner
*Attorney, Agent, or Firm*—Ronald B. Sherer; Barry Moyerman

[57] ABSTRACT

*A cryogenic freezer for freezing products comprising an elongated horizontal tunnel, a conveyor extending therethrough, a liquid cryogenic spray at the outlet end of the conveyor, a plurality of substantially closed gas recirculating flow paths in series relationship along the length of the tunnel and individual fans in each recirculating flow path for causing gas contact with product being conveyed through the tunnel.*

11 Claims, 5 Drawing Figures

PARALLEL FLOW CRYOGENIC FREEZER

Matter enclosed in heavy brackets [ ] appears in the original patent but forms no part of this reissue specification; matter printed in italics indicates the additions made by reissue.

The present invention relates to methods and apparatus for freezing articles with cryogenic liquids and, more particularly, the present invention relates to an improved spray-type tunnel freezer specifically designed for ultra-fast freezing of food products.

It is well known in the prior art that cryogenic liquids such as liquid carbon dioxide, liquid nitrogen, liquid air, and other refrigerants having normal boiling points substantially below minus 50° F. can be utilized to freeze foods which cannot be satisfactorily frozen by so-called "mechanical" refrigeration systems employing relatively high boiling point refrigerants such as brine, ammonia, Freon, and the like. For example, foods having high water contents such as tomatoes and citrus fruits cannot be satisfactorily frozen with mechanical systems due to the fact that the relatively slow freezing rates produce ice crystal growth which ruptures the delicate cell walls and results in collapse of the fruit upon thawing. With cryogenic liquids, however, freezing rates can be obtained which are so fast that high water content products can be frozen in substantially amorphous form whereby little or no collapse occurs upon thawing. In addition, cryogenic freezing systems produce substantially less dehydration and they require substantially less capital investment per unit of freezing capacity. Also, they are less subject to mechanical breakdowns since cryogenic freezers do not require complex compressors, condensers, or evaporators.

It is also known in the prior art that the rate of heat transfer between a solid product and a boiling liquid refrigerant is greater than that between the product and a gaseous refrigerant. Thus, it is generally preferable to have direct contact between the cryogenic liquid and the product in order to achieve maximum effectiveness of the latent heat of the refrigerant. Furthermore, it has been found that spray contact is superior to immersion for most food products due to the fact that immersion in a cryogenic liquid produces a gaseous film or envelope about the product which acts as a barrier against further contact of the liquid with product. With a relatively high velocity spray, however, the droplets of liquid continuously penetrate the gaseous film and thereby produce higher rates of heat transfer.

In addition to maximizing the heat transfer rates between the cryogenic liquid and the product, it is obvious that the sensible heat in the extremely cold gas resulting from vaporization of the cryogenic liquid should be efficiently transferred to the product before the gas is wasted in any type of open system; an open system being one wherein the refrigerant gas is not recirculated in a closed loop to a reliquefier for repeated use. However, various attempts to transfer the sensible heat of the cold gas to the product have had relatively low thermal efficiencies due to a number of factors. For example, some designs have relied upon laminar flow of the cold gas in heat exchange with the product, however, laminar flow produces relatively low rates of heat transfer such that exceedingly long tunnels and contact times are required. Other designs have utilized a plurality of axial flow fans spaced along the length of the tunnel in an effort to produce high velocity turbulent flow of the cold gas perpendicularly against the product. While the latter designs have substantially increased thermal efficiencies, the use of axial flow fans requires tunnels of larger cross section which results in increased heat leak. In addition, the total number of pounds of gas in the plurality of toroidal flow patterns becomes quite large with the result that significant amounts of horsepower are required to circulate the gas. Hence, significant amounts of undesirable heat are added to the system. Even more importantly, the regions of high velocity gas flow are quite localized with the result that the product is nonuniformly cooled. That is, product on the center of the conveyor belt is cooled and frozen to a lower temperature than the product near the edges of the belt which, in extreme cases, is not frozen at all. In addition, these designs have permitted relatively large amounts of cold gas to exit from the product outlet end of the tunnel while permitting warm, moist ambient air to enter the tunnel. Obviously, this warm air substantially decreases the thermal efficiency of the freezer and it also causes frost to form in the tunnel and particularly on the fans or blowers so that frequent shutdown for defrosting is required.

Therefore, it is a principal object of the present invention to provide a cryogenic freezer having substantially increased thermal efficiency.

It is another object of the present invention to provide a cryogenic freezer having a hihg velocity turbulent flow of cold gas in contact with the product while avoiding the disadvantages of the prior art freezers.

It is a further object of the present invention to provide a cryogenic freezer having improved means for preventing the loss of cold gas and the entrance of ambient air through the product outlet end of the tunnel.

The above objects, as well as others relating to the details of construction and operation will be more fully apparent from the following description taken with the accompanying drawings in which.

Figures 1A, 2, 3:
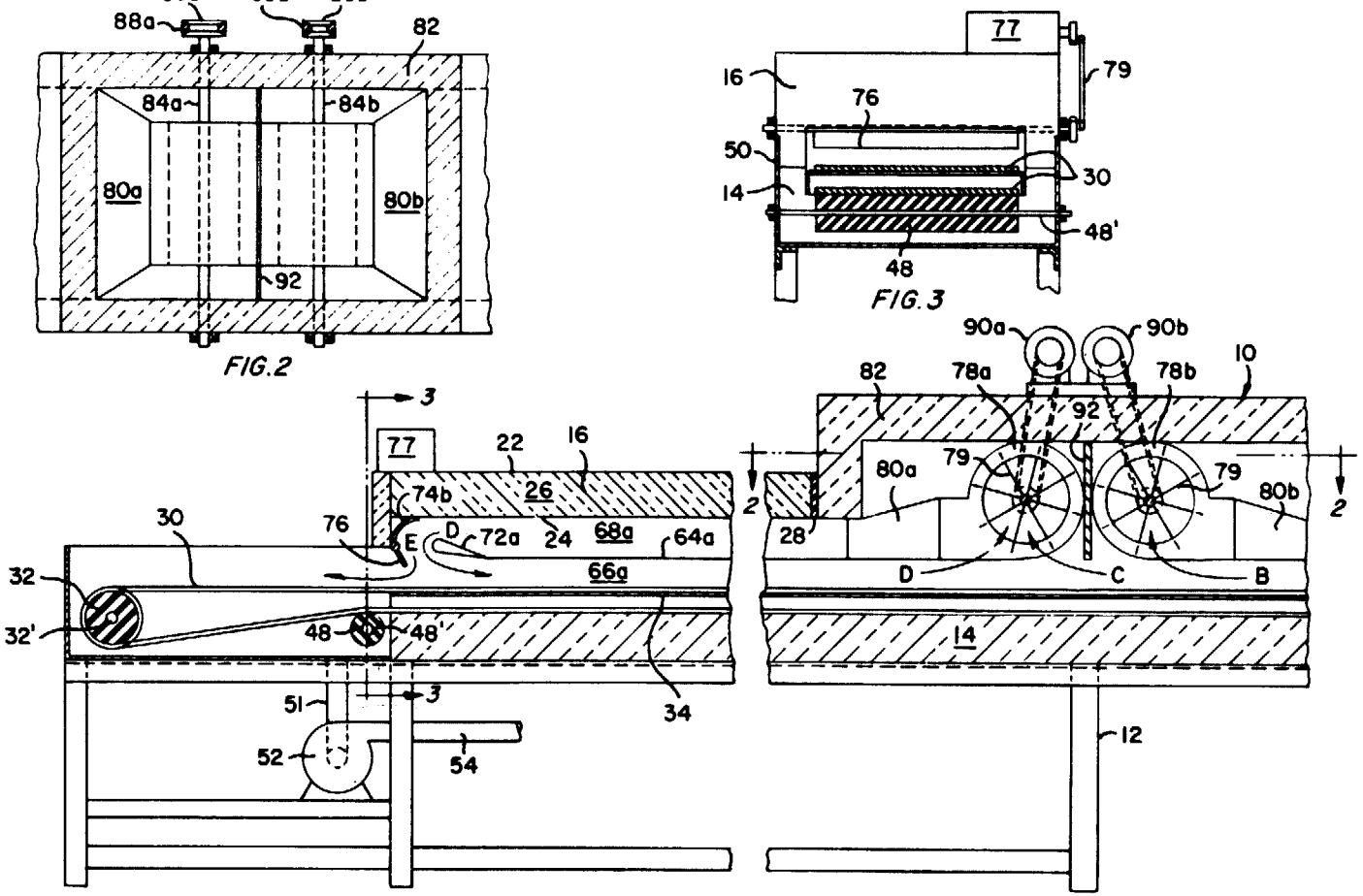
FIG. 1A is a side elevational view showing the product inlet end of the freezer in cross section.
FIG. 2 is a top sectional view of the midportion of the tunnel taken along the plane indicated by view line 2—2 on FIG. 1A.
FIG. 3 is a sectional view of the inlet end of the tunnel taken along the plane indicated by view line 3—3 on FIG. 1A.
Figure 4:
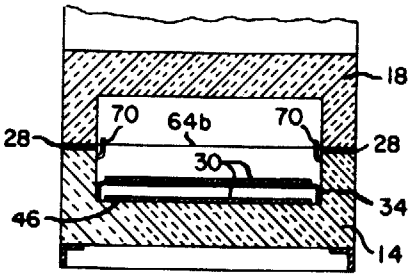
FIG. 4 is a sectional view of the tunnel taken along the plane indicated by view line 4—4 on FIG. 1B.
Figure 1B:
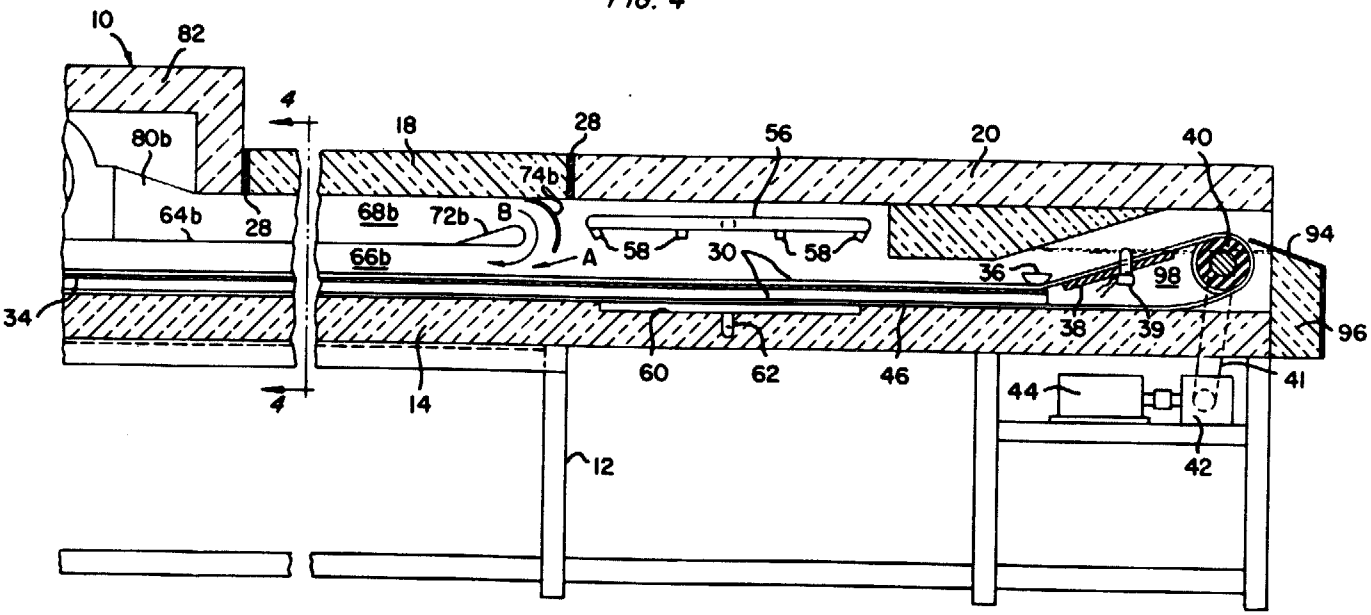
FIG. 1B is a side elevational view showing the product outlet end of the freezer in cross section.

Referring first to FIGS. 1A and 1B, the freezer is generally in the form of an elongated tunnel 10 mounted upon a supporting frame 12 of any convenient height. As shown more clearly in FIGS. 3 and 4, tunnel 10 is generally of rectangular cross section formed by a lower, U-shaped section 14 and a plurality of upper, U-shaped sections 16, 18 and 20. Each of the sections is preferably composed of inner and outer sheetmetal walls 22 and 24 enclosing suitable thermal insulation 26 which, for example, may be expanded polyurethane or polystyrene. Since the freezer is primarily designed for freezing food products for human consumption, walls 22 and 24 are composed of stainless steel in order to meet state and federal health codes, however, other materials such as aluminum or fiberglass may be employed where food products are not involved. In order to minimize heat leak through the joints between the sections, suitable seals such as sponge rubber gaskets 28 are provided in all of the joints.

The product to be frozen is moved through the tunnel from left to right as viewed in FIGS. 1A and 1B by an open mesh stainless steel conveyor belt 30 the left end of which turns about an idler roller 32. The upper reach of the conveyor rides over the upper surface of a series of inverted U-shaped supports 34 (see FIG. 4) which are removable to facilitate periodic cleaning of the tunnel. After passing through almost the entire length of the tunnel, the edges of the upper reach of the conveyor pass under low-friction guides 36 and the upper reach then rises over a support plate 38 carrying a thermocouple 39. At the right end of the tunnel, the conveyor turns about a drive roller 40 which is driven by a belt-and-pulley assembly 41 from a speed reducer 42 coupled to a variable speed electric motor 44. After passing around drive roller 40, the lower reach of the conveyor rides over the interior horizontal surface 46 of lower section 14 and then passes over an idler roller 48 before turning around end roller 32.

As shown in FIGS. 1A and 3, rollers 48 and 32 are supported by shafts 48' and 32' suitably journalled in the vertical side walls of an open top trough 50. As will be more fully explained hereinafter, trough 50 functions as a collector for collecting the refrigerant gas which is exhausted from the product inlet end of the tunnel after passing in heat exchange with the product. In order to exhaust the gas from the collector 50, an outlet pipe 51 connects the bottom of the collector with the inlet of a suction blower 52 which forces the gas through discharge conduit 54 to a remote point at which the gas may be vented to atmosphere.

Referring now to FIG. 1B, section 20 contains a spray header 56 having a plurality of nozzles 58 which spray slightly overlapping areas of the conveyor with a cryogenic liquid such as, for example, liquid nitrogen. Immediately below the nozzles, the bottom of section 14 is slightly recessed so as to form a sump 60 for collecting excess liquid which is then returned through pipe 62 to the pump (not shown) which supplies the liquid to header 56.

In order to efficiently utilize the sensible heat of the refrigerant gas which is formed by the vaporization of the cryogenic liquid upon contact with the product in the spray chamber, the present invention provides a pair of high velocity gas recirculation zones formed by the provision of longitudinally extending partitions 64a and 64b which divide the tunnel into lower, gas-food contact passages 66a, 66b and upper, gas recirculation passages 68a, 68b. As most clearly shown in FIG. 4, partitions 64a and 64b are longitudinally positioned by pins 70 secured to the side walls of the lower section while the edges of the partitions are removably clamped between the edges of the upper and lower sections. Thus, the partitions may be readily removed to facilitate periodic cleaning of the tunnel.

At the end of partition 64b immediately adjacent the spray chamber, a flow reversing passage is formed by a vane 72b and a 180° deflector 74b which are preferably secured to the inner walls of upper section 18. At the opposite end of the tunnel, a second flow reversing passage is formed at the end of partition 64a by a vane 72a and a 90° deflector 74b. In addition, it will be noted that a pivoted control blade 76 is provided for varying the flow pattern of the gas at the product inlet end of the tunnel and, as shown in FIG. 3, the position of the blade may be varied by a controller 77 connected to the blade shaft by suitable linkage 79.

As further shown in FIGS. 1A and 1B, the high velocity flow of the refrigerant gas through the recirculation zones is achieved by a pair of blowers 78a and 78b having noncurved, radial blades 79 which are substantially unaffected by frost build-up. The blowers and their respective discharge ducts 80a and 80b are preferably secured to an insulated cover 82 the sides of which rest upon the sides of lower section 14 whereby the entire fan assembly is fully removable. As most clearly shown in FIG. 2, the blowers include respective drive shafts 84a and 84b extending through the side wall of cover 82 and the shafts carry respective pulleys 86a and 86b which are driven by belts 88a and 88b from drive motors 90a and 90b. For reasons which will be explained subsequently, fan 78a must be driven at a higher speed than fan 78b and this may be achieved by different speed motors 90a and 90b, or by the use of different size pulleys as shown in FIG. 2. Lastly, it will be noted that a vertical partition 92 is positioned between the blowers such that the lower edge of the partition terminates in the plane of horizontal partitions 64a and 64b.

In the operation of the freezer, the product to be frozen is bedded on the upper reach of conveyor 30 at the extreme left end of the freezer and the product then passes through chambers 66a and 66b of the two recirculation zones in series. Thereafter, the product passes beneath nozzles 58 which spray the product with a cryogenic liquid which, for purposes of this description, will be assumed to be liquid nitrogen (LIN) at a temperature of minus 320° F. After leaving the spray zone, the product travels upwardly over plate 38 to a level which is above that of the horizontal portion of the conveyor and the product then slides down a plate 94 secured to end wall 96 to the next station in the processing line which, for example, may be a packaging machine.

When the product exits from the freezer, the product may be either core-frozen or only crust-frozen depending upon the selected speed of the conveyor. In any event, the contact of the liquid nitrogen with the relatively warm product results in varorization of the liquid as the latent heat of the liquid is transferred to the product. As a result, a certain amount of extremely cold gaseous nitrogen ($N_2$) is generated in the spray chamber and, for a given set of constant operating parameters, the amount of gas generated will remain substantially constant. Thus, the speeds of fans 78a and 78b may be set so that the generated gas, represented by arrow A, will be added to the high velocity flow of recirculated gas represented by arrow B. Of course, some of the gas generated in the spray zone will flow toward the product exit end of the tunnel. However, because this extremely cold gas has a density which is approximately twice that of the warm ambient air, the cold gas acts like a liquid in that it seeks the lowest possible level. Thus, the level of the gas in the outlet end of the tunnel can be controlled by the setting of the fan speeds such that the hydrostatic head of the dense gas prevents it from spilling over the top of elevated end wall 96 while maintaining a level in reservoir 98 above that of chamber 66b. In this manner, the cold dense gas forms a fluid seal at the product outlet end of the tunnel which prevents the warm ambient air from entering the tunnel.

Referring back to the gas flow represented by arrows A and B, the combined gas stream flows in countercurrent heat exchange with the product through chamber 66b toward the inlet of blower 78b. However, blower 78b operates at constant volume and is unable to handle the sum of its own recirculated discharge, represented by arrow B, plus the newly generated gas, represented by arrow A. Thus, an amount of gas equal to the newly generated gas flows under partition 92 into the inlet of blower 78a as represented by arrow C. This is made possible by the greater capacity of blower 78a which is due to the higher operating speed of this blower. At the same time, recirculated gas from chamber 66a, represented by arrow D, is also drawn into the inlet of blower 78a and the sum of the two gas streams is discharged through passage 68a toward the reversing passage formed by deflector 74a and vane 72a. At this point, control blade 76 is set such that the gas stream from passage 68a splits into a first component, represented by arrow D, which returns to the blower in concurrent heat exchange with the product and an exhaust stream represented by arrow E. Of course, the amount of the exhaust stream represented by arrow E is substantially equal to the make-up flow represented by arrow C which, as previously stated, is equal to the newly generated gas represented by arrow A. The exhaust stream, represented by arrow E, flows out of the food inlet end of the tunnel into collector 50 from which blower 52 forces the gas through exhaust duct 54 to a remote point of venting to atmosphere. However, if a cryogenic liquid such as liquid air is employed and there is no further use for the exhaust gas, blower 52 and duct 54 may be eliminated since their only function is to prevent a buildup of nonlife-supporting gas such as nitrogen in the vicinity of the tunnel.

From the foregoing description of one embodiment of the invention, it will be apparent that extremely high rates of heat transfer are made possible due to the fact that high velocity turbulent flows may be achieved in chambers 66a and 66b. In addition, the flow rate of the refrigerant gas through chambers 66a and 66b is substantially constant across the width of the conveyor belt due to the fact that the pressure drop through the reversing passages acts as a highly efficient diffuser and smooths out the velocity profile of the gas. Thus, all of the product across the width of the belt is uniformly precooled and frozen to the same degree.

A further advantage of the present invention resides in the precise control of the gas flow which is accomplished by varying the setting of control blade 76. That is, the amount of gas which is exhausted (arrow E) can be increased by moving the blade in the clockwise direction from the illustrated position or decreased by moving the blade in the counterclockwise direction. However, since the rate at which gas is generated in the spray chamber is fixed for constant operating conditions, a decrease in the amount of gas exhausted at the product inlet end of the tunnel results in a buildup of the gas level in reservoir 98 and, conversely, an increase in the amount of gas exhausted at the inlet end lowers the level of the gas in the reservoir. Thus, the present invention utilizes a thermocouple 39 to detect the gas level in the reservoir and the thermocouple transmits a signal to controller 77 to adjust the position of blade 76 so as to maintain a predetermined level of gas in the reservoir which is sufficient to maintain an effective fluid seal at the tunnel outlet. As a result, ambient air is prevented from entering the outlet end of the tunnel and the cold refrigerant gas is prevented from leaving the tunnel without first passing in heat exchange with the product.

Although it will be readily apparent that the above disclosed freezer may be designed to operate with widely varying flow rates and temperature profiles, the following data is given as an illustrative example of one practical embodiment of the invention. A prototype freezer 22 feet long having a belt width of 16 inches has been found to operate in a very successful manner when recirculation fans 78a and 78b are operated at 521 c.f.m. and 468 c.f.m., respectively. Under these conditions, the gas flow through chambers 66a and 66b has been found to be highly turbulent but not of sufficient velocity to produce the substantial dehydration of the product as compared to conventional "blast" freezers. During these tests, the temperature of the refrigerant gas at the point of mixing of flow streams A and B was in the order of minus 95° F. while the temperature at the suction of fan 78b was in the order of minus 73° F. At the same time, the temperature of the refrigerant gas at vane 72a in the order of minus 5° F. while the suction of fan 78a was in the order of plus 3° F. Thus, the recirculation zone adjacent the spray chamber operated with a temperature gradient of 22° F. while the zone adjacent the product inlet operated with a temperature gradient of 8° F. As a result, product was subfrozen to minus 25° F. in less than five minutes.

From the foregoing description, it will be readily appreciated that numerous modifications will become apparent to those skilled in the art. For example, it is obvious that any number of recirculation zones may be employed and that the blowers may be positioned so as to recirculate the gas in the same directions in each of the zones instead of in the mutually opposite directions as shown in the illustrated embodiment. Therefore, it is to be understood that the foregoing description is intended to be illustrative rather than exhaustive of the invention and that the latter is not to be limited other than as expressly set forth in the following claims including all patentable equivalents thereof.

What is claimed is:

1. A method for ultra-fast freezing of products with a cryogenic refrigerant including the steps of:

(a) continuously moving said product to be frozen through an insulated tunnel along a predetermined path;

(b) continuously contacting said product with a cryogenic liquid in said tunnel to freeze the product while vaporizing the cryogenic liquid to form a cold gas;

(c) continuously collecting said cold gas resulting from said vaporization in a portion of said tunnel;

(d) continuously recirculating the major portion of said collected gas through a substantially closed path at least one-half of which closed path is parallel to and coincident with said predetermined path along a substantial extent thereof;

(e) continuously adding cold gas resulting from newly vaporized cryogenic liquid to said recirculation path;

(f) continuously removing some of said recirculated gas from said closed path in an amount which is substantially equal to the amount of cold gas continuously added to said recirculation path;

(g) maintaining the velocity of said recirculated gas in said closed path sufficient to cause turbulent flow of the gas in contact with said food product;

(h) collecting a minor portion of said cold gas in a reservoir immediately adjacent the outlet of said tunnel;

(i) detecting the level of said cold gas in said reservoir; and (j) regulating the amount of recirculated gas which is removed from said substantially closed path as a function of said detected level.

2. The method as claimed in claim 1 wherein the step of continuously contacting said product with a cryogenic liquid comprises the step of spraying said product with liquid nitrogen.

3. A cryogenic freezer for ultra-fast freezing of products comprising: insulated wall means forming an elongated tunnel, conveyor means having at least one reach extending through the interior of said tunnel for conveying a food product through said tunnel, means positioned in said tunnel for contacting said food product with a cryogenic liquid whereby said product is frozen and substantially all of said liquid is vaporized to form a refrigerant gas, first and second partition means extending through different portions of said tunnel parallel to and in series along the length of said conveyor, said first and second partition means dividing said tunnel into respective first and second pairs of gas-product contact passages and gas return passages, the passages of each pair being in communication with each other at the ends of the respective partition means so as to form individual first and second recirculation paths located in series along said conveyor reach between the tunnel and said means for contacting the product with liquid, first passage means for continuously conducting newly generated refrigerant gas into said first recirculation path, second passage means for conducting some of the recirculated gas from said first path into said second path, third passage means for conducting some of the recirculated gas from said second path, and blower means for recirculating refrigerant gas through each of said substantially closed paths at a velocity sufficient to produce turbulent flow of the refrigerant gas in contact with the product on said conveyor reach.

4. The freezer as claimed in claim 3, wherein said blower means comprise first and second blowers respectively positioned in said first and second paths and wherein said second blower has a greater capacity in terms of cubic feet of gas moved per unit time than said first blower whereby a portion of said gas is drawn from said first path into said second path.

5. A freezer for ultrafast freezing of products with a cryogenic refrigerant comprising: insulated wall means forming an elongated tunnel, conveyor means having at least one reach extending through the interior of said tunnel for conveying a product through said tunnel, means positioned in said tunnel for contacting said product with cryogenic liquid whereby said product is frozen and substantially all of said liquid is vaporized to form a refrigerant gas, means in said tunnel forming a gas-product contact chamber, first passage means for conducting refrigerant gas into said chamber, second passage means for removing refrigerant gas from said chamber, flow control means in said second passage means for controlling the amount of refrigerant gas removed from said contact chamber, means forming a reservoir of refrigerant gas adjacent the product outlet end of said tunnel, means for detecting the level of refrigerant gas in said reservoir and producing a signal indicative of said level, and means actuated by said signal for regulating said flow control means.

6. The freezer as claimed in claim 5 wherein said gas-product contact chamber includes partition means extending through a substantial portion of said tunnel parallel to the direction of movement of said conveyor reach to form a recirculation path, and blower means for recirculating refrigerant gas through said path at a velocity sufficient to produce turbulent flow of the gas in contact with the product.

7. A cryogenic freezer for ultra-fast freezing of products comprising: insulated wall means forming an elongated tunnel, conveyor means having at least one reach extending through the interior of said tunnel for conveying a food product through said tunnel, means positioned in said tunnel for contacting said food product with a cryogenic liquid whereby said product is frozen and substantially all of said liquid is vaporized to form a refrigerant gas, partition means extending through a substantial portion of said tunnel parallel to the direction of movement of said conveyor reach dividing said tunnel into a gas-product contact passage surrounding said conveyor reach and a gas return passage, said contact and return passages being in communication with each other at the ends of said partition means to form a substantially closed recirculation path wholly within said insulation wall means, first passage means for continuously conducting newly generated refrigerant gas into said recirculation path zone, second passage means for continuously removing recirculated gas from said recirculation path, and blower means for recirculating said gas through said recirculation path at a velocity sufficient to produce turbulent flow of the refrigerant gas in contact with the product on said conveyor reach, said recirculation path being positioned between the tunnel inlet and said means for contacting the product with liquid, said blower means being positioned inside said insulated wall means forming said tunnel, said blower having an inlet in direct communication with one of said passages and an outlet in direct communication with the other of said passages whereby said gas is recirculated through said path and blower means wholly within the confines of said insulated wall means forming said tunnel.

8. The freezer as claimed in claim 7 wherein said blower comprises a centrifugal blower having flat, noncurved, radially extending blades for minimizing the effect of frost accumulation on said blades.

[9. A cryogenic freezer for ultra-fast freezing of products with a cryogenic liquid comprising:

(a) insulated wall means forming an elongated, horizontally extending tunnel having an inlet and an outlet;

(b) conveyor means having at least one reach extending through the interior of said tunnel for conveying a product to be frozen through said tunnel from said inlet to said outlet;

(c) means forming a liquid-product contact zone in said tunnel, said means including conduit means for introducing a cryogenic liquid refrigerant into said tunnel in contact with said product on said conveyor for freezing said product and vaporizing said liquid to form a refrigerant gas;

(d) passage means forming a plurality of distinct, substantially closed, recirculation paths for independently recirculating said refrigerant gas in each of said paths, said recirculation paths being adjacent each other in series along the length of said conveyor for successfully contacting the product on the conveyor with the gas recirculating in each path, all of said recirculation paths being positioned between said tunnel inlet and said liquid-product contact zone;

(e) passage means for conducting newly generated refrigerant gas from said liquid-product contact zone into the recirculation path adjacent thereto;

(f) passage means for conducting portions of the refrigerant gas from each recirculation path to the next recirculation path closer to said tunnel inlet such that the average temperature of the gas in each path increases in the direction of the tunnel inlet;

(g) passage means for exhausting a portion of the refrigerant gas from the recirculation path closest to said tunnel inlet; and (h) gas flow producing means for recirculating the refrigerant gas in each of said recirculation paths at a velocity sufficient to produce turbulent flow of the refrigerant gas in contact with the product.]

[10. The cryogenic freezer as claimed in claim 9 wherein the gas flow producing means for each recirculation path have unequal flow capacities for producing flow of portions of refrigerant gas from one recirculation path to the next in the direction toward the tunnel inlet.]

[11. The cryogenic freezer as claimed in claim 9 further including means forming a reservoir of cold, dense refrigerant gas adjacent said tunnel outlet for producing a fluid seal against entrance of ambient air into the tunnel and against the exit of refrigerant gas through said tunnel outlet.]

[12. The cryogenic freezer as claimed in claim 9 wherein the flow of refrigerant gas in at least two of said plurality of recirculation paths is parallel to the direction of product movement along a substantial portion of said conveyor reach.]

[13. The cryogenic freezer as claimed in claim 12 including means for increasing and decreasing the volume of refrigerant gas flowing through said exhaust passage means, and means for sensing an operating condition of the freezer remote from said exhaust passage whereby said volume of exhausted gas is adjusted in accordance therewith.]

*14. A cryogenic freezer for ultra-fast freezing of products with a cryogenic liquid comprising:*

*(a) insulated wall means forming an elongated, horizontally extending tunnel having an inlet and an outlet;*

*(b) conveyor means having at least one reach extending through the interior of said tunnel for conveying a product to be frozen through said tunnel from said inlet to said outlet;*

*(c) means forming a liquid-product contact zone in said tunnel, said means including conduit means for introducing a cryogenic liquid refrigerant into said tunnel in contact with said product on said conveyor for freezing said product and vaporizing said liquid to form a refrigerant gas;*

*(d) passage means forming a plurality of distinct, substantially closed, recirculation paths for independently recirculating said refrigerant gas in each of said paths, said recirculation paths being adjacent each other in series along the length of said conveyor for successfully contacting the product on the conveyor with the gas recirculating in each path, all of said recirculation paths being positioned between said tunnel inlet and said liquid-product contact zone;*

*(e) passage means for conducting newly generated refrigerant gas from said liquid-product contact zone into the recirculation path adjacent thereto;*

*(f) passage means for conducting portions of the refrigerant gas from each recirculation path to the next recirculation path closer to said tunnel inlet such that the average temperature of the gas in each path increases in the direction of the tunnel inlet;*

*(g) passage means for exhausting a portion of the refrigerant gas from the recirculation path closest to said tunnel inlet; and*

*(h) gas flow producing means for recirculating the refrigerant gas in each of said recirculation paths at a velocity sufficient to produce turbulent flow of the refrigerant gas in contact with the product, said gas flow producing means for each recirculation path having unequal flow capacities for producing flow of portions of refrigerant gas from one recirculation path to the next in the direction toward the tunnel inlet.*

*15. The cryogenic freezer as claimed in claim 14 wherein the flow of refrigerant gas in contact with the product in at least two of said plurality of recirculation paths is parallel to the direction of product movement along a substantial portion of said conveyor reach.*

*16. The cryogenic freezer as claimed in claim 15 including means for increasing and decreasing the volume of refrigerant gas flowing through said exhaust passage means, and means for sensing an operating condition of the freezer remote from said exhaust passage whereby said volume of exhausted gas is adjusted in accordance therewith.*

* * * * *